(12) United States Patent
Wessel (10) Patent No.: US 6,892,821 B2
(45) Date of Patent: May 17, 2005

(54) TURF AERATOR WITH UNIBODY CONSTRUCTION AND RECIPROCATING TINES

(75) Inventor: Elmer A. Wessel, Lincoln, NE (US)

(73) Assignee: Sourceone, Inc., Lincoln, NE (US)

( * ) Notice: Subject to any disclaimer, the term of this patent is extended or adjusted under 35 U.S.C. 154(b) by 0 days.

(21) Appl. No.: 10/604,088

(22) Filed: Jun. 25, 2003

(65) Prior Publication Data

US 2005/0006110 A1 Jan. 13, 2005

(51) Int. Cl.[7] .............................................. A01B 45/02
(52) U.S. Cl. ....................................................... 172/22
(58) Field of Search ............................. 172/21, 22, 42, 172/43, 51, 245, 540, 556, 574, 256, 611

(56) References Cited

U.S. PATENT DOCUMENTS

| 5,207,278 | A | * | 5/1993 | Hatlen | 172/22 |
| 5,398,767 | A | * | 3/1995 | Warke | 172/21 |
| 5,680,903 | A | * | 10/1997 | Oliver | 172/22 |
| 6,179,061 | B1 | * | 1/2001 | Fiore | 172/21 |
| 6,708,773 | B1 | * | 3/2004 | Kinkead et al. | 172/21 |

OTHER PUBLICATIONS

Parts list for 22" Compact Turf Aerator available as Model Nos. PL400B and PL400H from Rock Solid ™, a division of Industrial Machine Specialties, Inc. (first published Nov., 2001).

Manual for 22" Compact Turf Aerator available as Model Nos. PL400B and PL400H from Rock Solid ™, a division of Industrial Machine Specialties, Inc. (first published Apr., 2001).

Brochure, including insert, entitled "PLUGR ™" and distributed by Rock Solid ™, a division of Industrial Machine Specialties, Inc. (first published 1999).

Brochure entitled "PLUGR ™, Plugr Aerates Circles Around the Competition" and distributed by Rock Solid ™, a division of Industrial Machine Specialties, Inc. (first published 2000).

* cited by examiner

Primary Examiner—Robert E Pezzuto
(74) Attorney, Agent, or Firm—Hovey Williams LLP

(57) ABSTRACT

A walk-behind power turf aerator having a rigid unibody construction and being shiftable into a highly compact configuration to facilitate transportation and storage thereof. The power turf aerator utilizes the reciprocal movement of a plurality of generally upright tines to create a relatively dense plug pattern in the turf.

34 Claims, 7 Drawing Sheets

TURF AERATOR WITH UNIBODY CONSTRUCTION AND RECIPROCATING TINES

This application is being filed contemporaneously with application for U.S. Des. Pat. Ser. No. 29/185,287, entitled TURF AERATOR, which is hereby incorporated by reference herein.

BACKGROUND OF INVENTION

1. Field of the Invention

The present invention relates generally to the field of turf aerators. In another aspect, the invention concerns walk-behind power turf aerators having a unibody construction and a compact configuration.

2. Description of the Prior Art

Walk-behind power aerators have been used for years to maintain healthy lawns by cutting and removing plugs from the turf. Due to the expense and infrequent required use of power aerators, most individual homeowners do not own a power turf aerator. Rather, the bulk of the power aerators in service today are owned by rental companies or professional lawn care providers. As such, power aerators are frequently transported from location to location either by individuals renting the aerator from a rental company or by professional lawn care providers servicing different clients. In the past, however, efficient transportation of power aerators has been encumbered by the high weight and bulky configuration of conventional power aerators. In most cases, a truck and/or trailer has been required to transport conventional power aerators because they would not fit in the trunk of a car.

Another disadvantage of conventional power aerators is the lack of structural rigidity of the aerator body. Power aerators are necessarily subjected to conditions of high mechanical vibration and repeated mechanical stress. Over time, conventional aerators which have been manufactured by bolting various body parts to a structural frame can require frequent maintenance and/or replacement of body parts which have been damaged or loosened during normal operation of the aerator. This problem can be especially pronounced when the power aerator is employed in a high-use situation, such as for power aerators owned by rental companies or professional lawn care providers. In addition, it has been discovered that many owners of conventional aerators fail to properly maintain their power aerators due to the difficulty of gaining access to the components needing routine maintenance (e.g., moving parts equipped with grease fittings/zerks). For example, many conventional aerators require a body panel to be unbolted in order to gain access to grease fittings that should be frequently used to properly lubricate the aerator.

Many conventional power aerators in use today employ a rotating rear "spoon" assembly equipped with a plurality (e.g., 20–50) individual spoons/tines extending radially from a common rotating shaft. When the spoon assembly is rotated by the motor, the spoons/tines penetrate into the turf and remove plugs therefrom. This traditional configuration has a number of disadvantages. For example, such a configuration causes the aerator to be very difficult to maneuver and typically requires additional "add-on" weights for effective operation. Further, such a configuration can only remove relatively shallow plugs and causes compaction of the soil and root exposure around the location where the plug is removed. In addition, the high number of relatively weak spoons/tines can necessitate frequent tine replacement, which is a time consuming and expensive activity.

SUMMARY OF INVENTION

It is, therefore, an object of the present invention to provide a power aerator that can be shifted into a highly compact configuration to facilitate transportation and/or storage of the power aerator.

A further object of the present invention is to provide a power aerator having a body with increased structural rigidity to thereby better resist the vibrational and load forces experienced during normal operation.

Another object of the present invention is to provide a power aerator that provides easy access to components which require regular maintenance.

Still another object of the present invention is to provide a power aerator that employs a minimal number of plug-removing tines, but creates a relatively dense plug removal pattern.

Yet another object of the present invention is to provide a power aerator utilizing high-strength tines that are easily replaceable.

A still further object of the present invention is to provide a power aerator which removes plugs from turf in a manner which causes minimal soil compaction and root exposure.

It should be understood that the above-listed objects are only exemplary, and not all the objects listed above need be accomplished by the invention described and claimed herein.

Accordingly, in one embodiment of the present invention, there is provided a turf aerator comprising a body having a unibody and a plurality of wheels rotatably coupled to the body and supporting the body for movement on the turf.

In another embodiment of the present invention, there is provided a turf aerator comprising a crank shaft assembly and a plurality of generally upright tines. The crank shaft assembly includes a rotatable crank shaft comprising a plurality of axially spaced plates and a plurality of eccentric bars. Each of the eccentric bars is rigidly coupled to and extends between a respective pair of adjacent plates. Each of the tines includes a connection portion rotatably coupled to a respective eccentric bar and a tip portion configured to cut and remove plugs from the turf.

In still another embodiment of the present invention, there is provided a highly transportable turf aerator that is shiftable between an operating configuration wherein the aerator can be used to remove plugs from the turf and a compact configuration wherein the dimensions of the aerator are minimized to facilitate transportation and storage of the aerator turf aerator comprises a substantially rigid body, a motor supported by the body, a plurality of tines shiftable relative to the body and powered by the motor, a plurality of wheels coupled to the body and providing for movement of the body on the turf, and a handle hingedly coupled to the body. The handle is shiftable between an extended position where it extends outwardly from the body and a folded position where it is over the body. The handle is in the extended position when the aerator is in the operating configuration, and the handle is in the folded position when the aerator is in the compact configuration.

BRIEF DESCRIPTION OF DRAWINGS

A preferred embodiment of the present invention is described in detail below with reference to the attached drawing figures, wherein.

DETAILED DESCRIPTION

Figures 1, 8, 9:
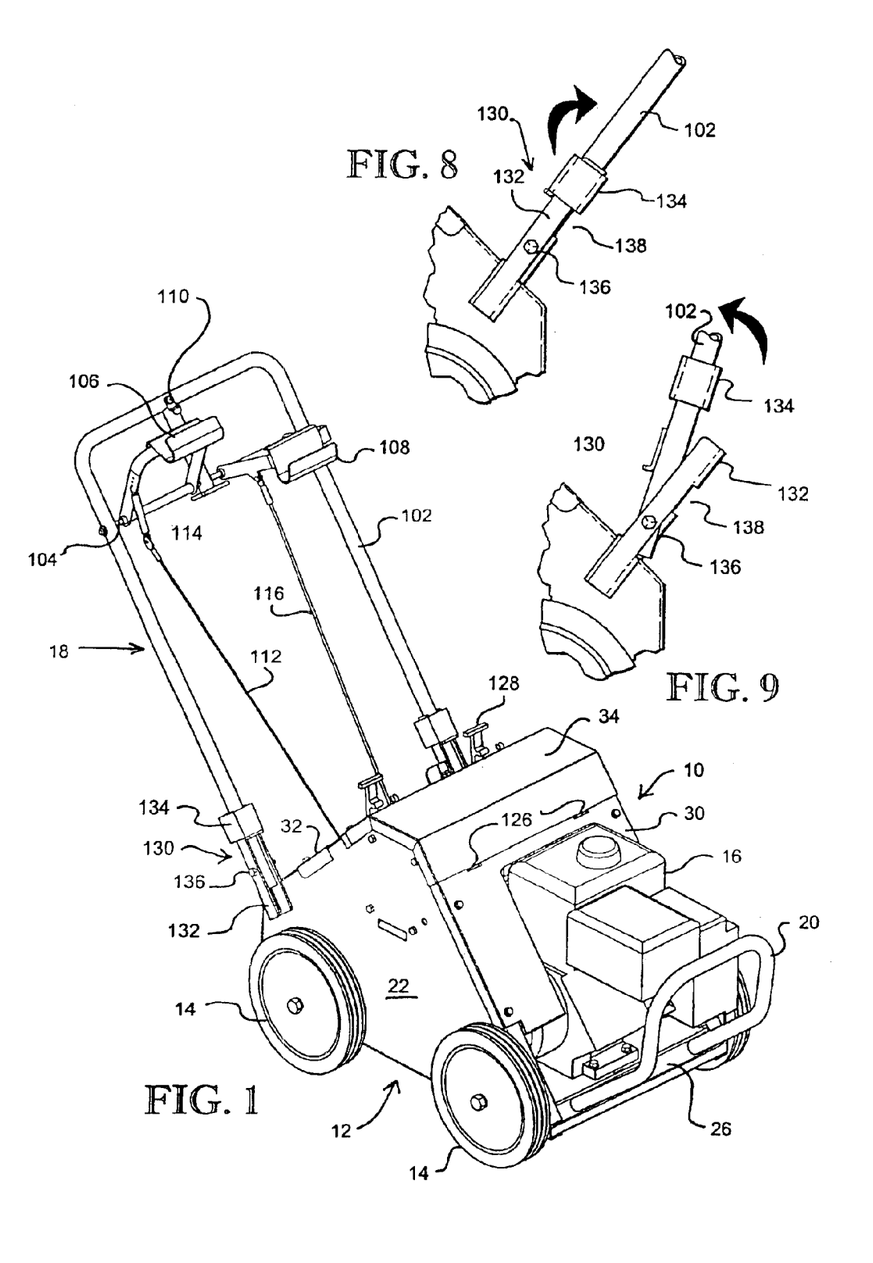
FIG. 1 is a front isometric view of a power aerator constructed in accordance with the principles of the present invention.
FIG. 8 is an enlarged side view of the base of a handle used to manipulate the aerator during operation, particularly illustrating the handle in an extended and locked position with a handle bar being locked in a handle base with a collar.
FIG. 9 is an enlarged side view similar to that of FIG. 8, particularly illustrating the handle being shifted out of the extended and locked position by sliding the collar off of the handle base and pivoting the handle bar in the handle base.
Figure 10:
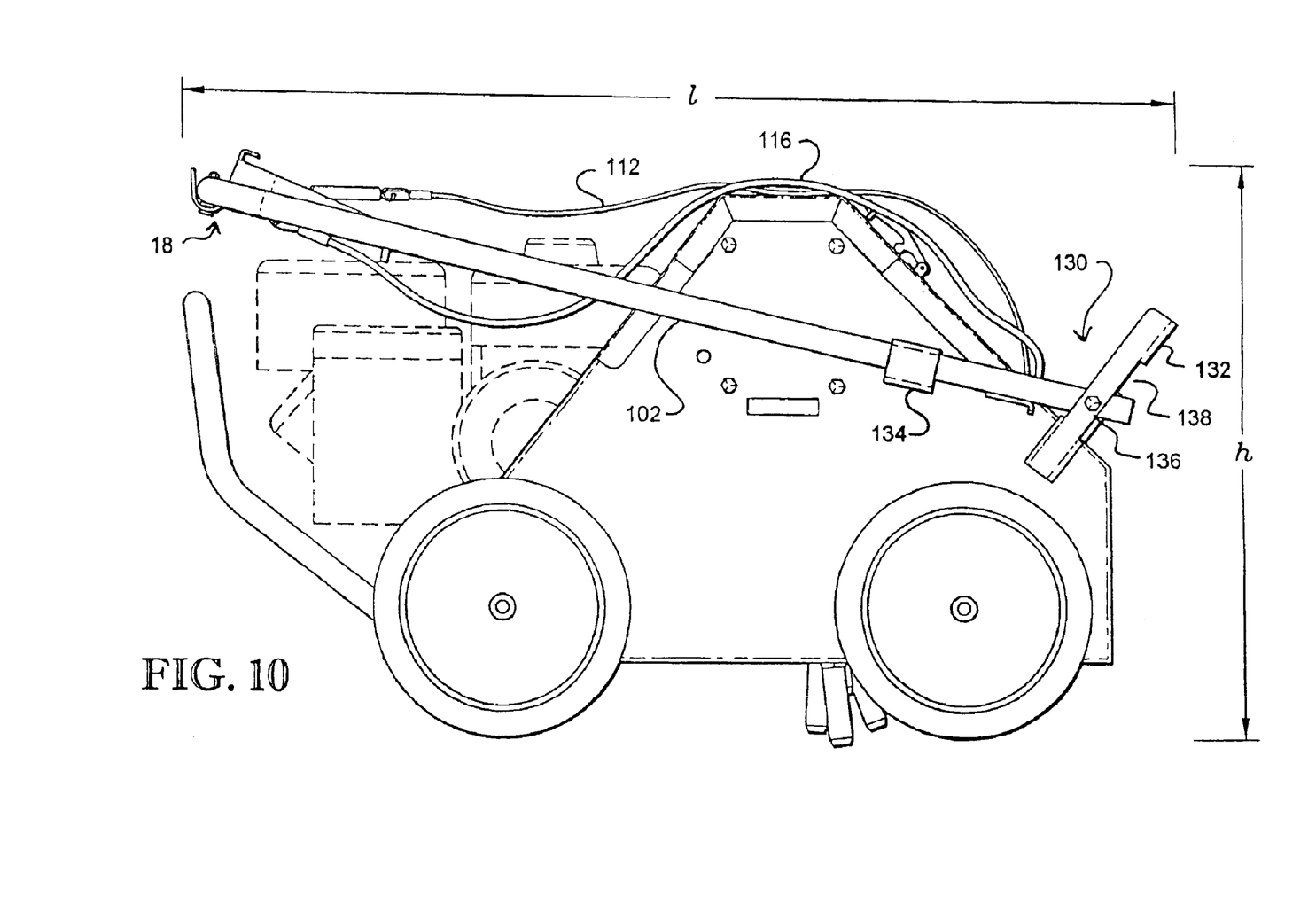
FIG. 10 is a side view of the power aerator in a compact configuration with the handle bar being positioned towards the front of the aerator to thereby minimize the height and length of the aerator.

Referring initially to FIG. 1, aerator 10 generally includes a body 12, a plurality of wheels 14, a motor 16, a handle assembly 18, and a guard bar 20. Wheels 14 are rotatably coupled to body 12 and provide for movement of aerator 10 on a surface, such as the turf being plugged by aerator 10. Wheels 14 can be any suitably strong conventional wheel assembly known in the art such as, for example, Gleason Corporation Model #99059450, available from Gleason Corporation of Milwaukee, Wis. Motor 16 is rigidly coupled to and supported by body 12 near the front of body 12. Motor 16 is preferably a 5 horse power Briggs and Stratton Inteka  gasoline engine with a 6:1 gear ratio; however, motor 16 can be any suitable engine of similar horse power and gear ratio such as, for example, commercially available Honda OHV engines. Handle assembly 18 is hingedly coupled to the rear of body 12 and can be pivoted relative to body 12 between an operating position where handle assembly 18 extends upwardly and rearwardly from body 12 (as shown in FIG. 1) and a transport/storage position where the handle is folded generally over body 12 (as shown in FIG. 10, which is discussed in detail below). Guard bar 20 is rigidly coupled to body 12 and extends generally upwardly and forwardly from the front of body 12. Guard bar 20 includes a generally horizontally extending portion that is positioned in front of motor 16 and protects motor 16 from frontal impact. The horizontal portion of guard bar 20 also provides a convenient manual grasping location to facilitate lifting of aerator 10 onto or off of an elevated surface, typically during transportation or storage of aerator 10.

Figures 2, 11:
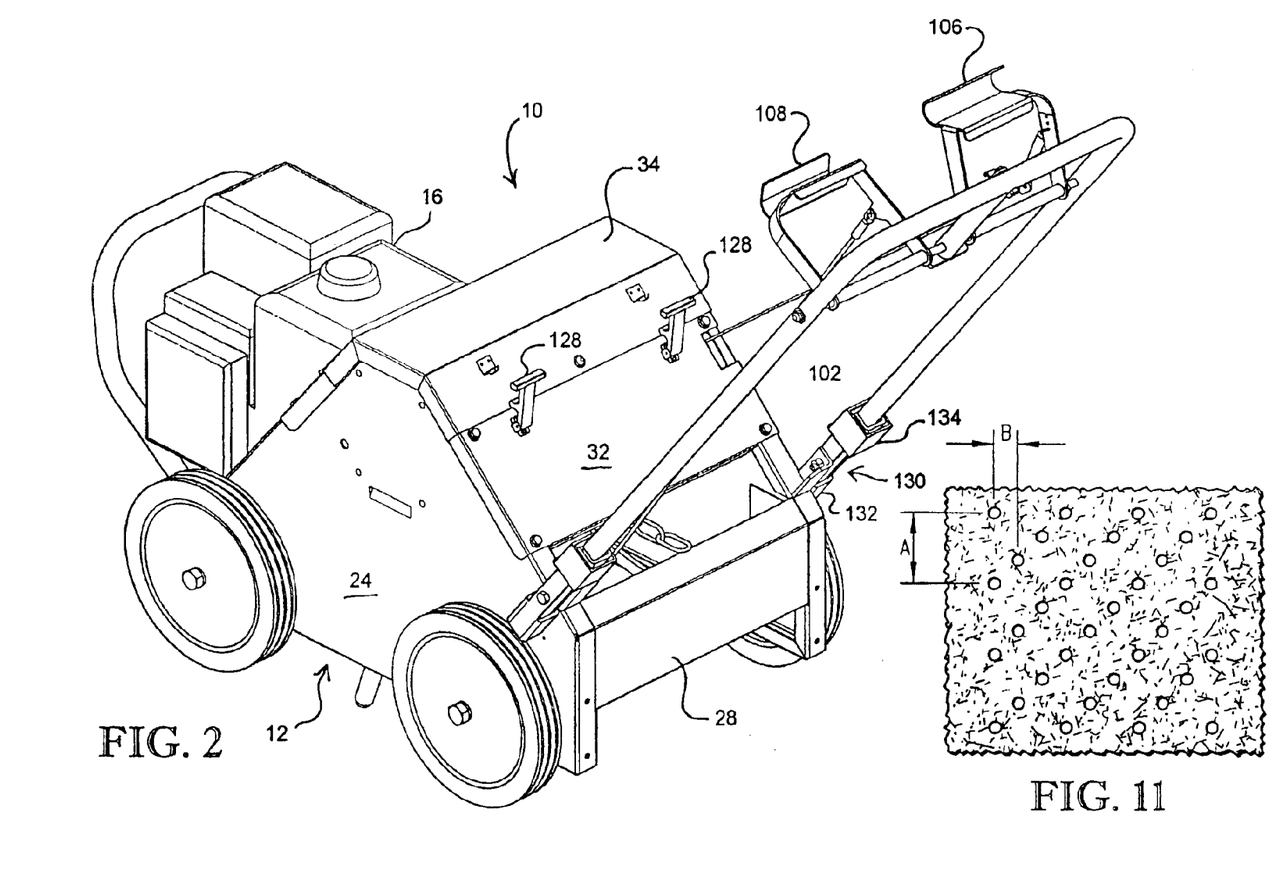
FIG. 2 is a rear isometric view of the power aerator.
FIG. 11 is a top view of a preferred plug pattern which can be created by the inventive aerator.
Figure 3:
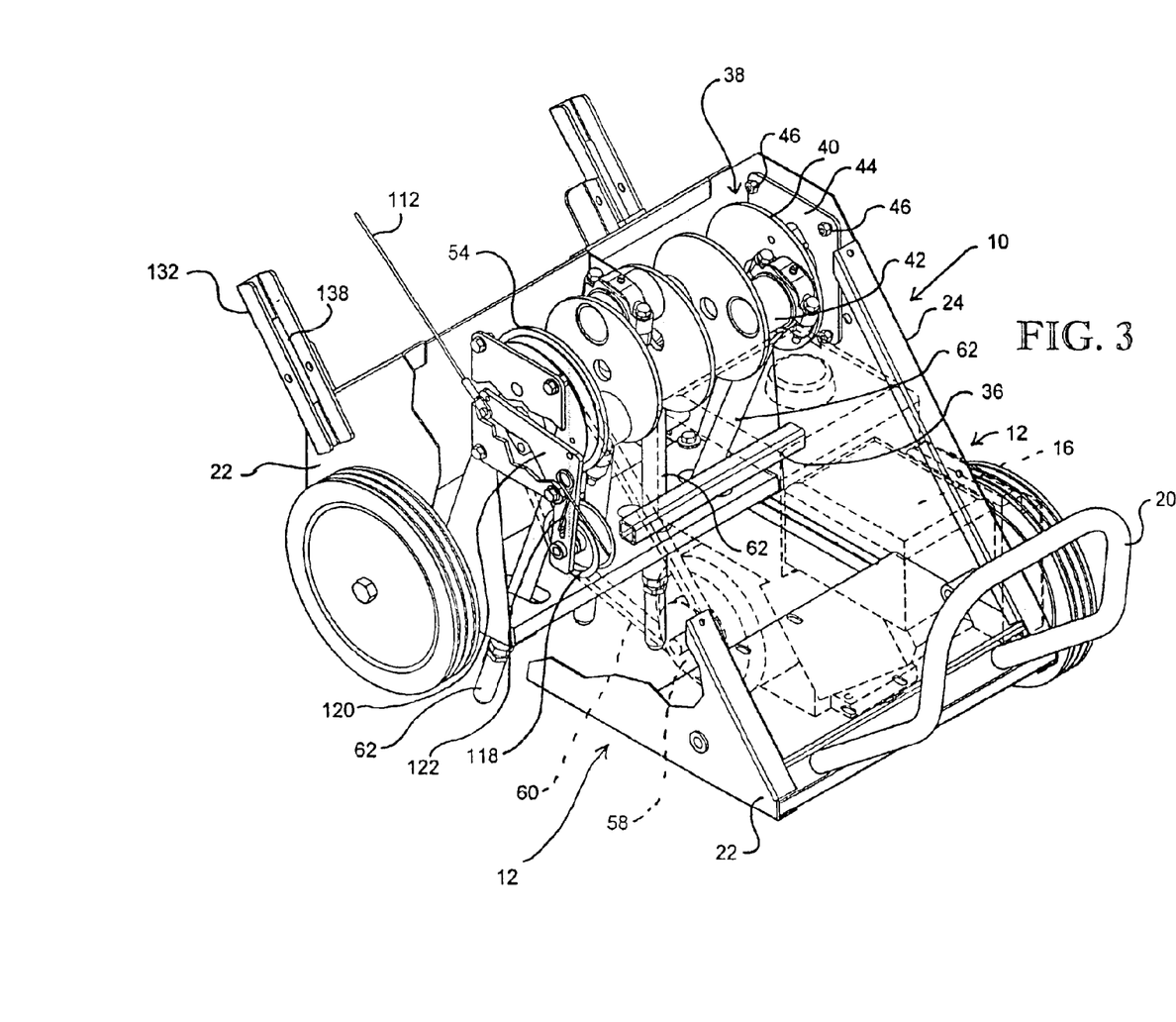
FIG. 3 is an enlarged cut-away front isometric view of the power aerator, particularly illustrating the unibody construction of the aerator body and the manner in which the crank shaft assembly is supported by the body.

Referring now to FIGS. 1 through 3, body 12 is comprised of a right side member 22, a left side member 24, a front member 26, and a rear member 28. Preferably, body 12 has a unibody construction. As used herein, the term "unibody construction" shall denote a manner of constructing an apparatus wherein sheet metal body parts are combined with stress-bearing elements to form the body and chassis of the apparatus as a single piece, as opposed to attaching body parts to a frame. It is preferred for members 22,24,26,28 of body 12 to be formed from sheet metal that has been bent to provide enhanced structural rigidity. As perhaps best shown in FIG. 3, a number of the edges of left and right side members 22,24 are bent in a generally U-shaped configuration, although a generally V-shaped or L-shaped configuration would also fBM_1_BM_1_unction to enhance the lateral strength of members 22,24. In addition to providing enhanced strength, the bent edges of left and right side members 22,24 provide convenient locations for attaching a front cover 30, a rear cover 32, and a top cover 34 (shown in FIGS. 1 and 2) to body 12. The sheet metal used to form members 22,24,26,28 of body 12 is preferably a 4 to 16 gauge steel sheet metal, more preferably a 6 to 14 gauge sheet metal, and most preferably an 8 to 12 gauge steel sheet metal. Body 12 also includes a lateral support member 36 (shown in FIG. 3) which extends between and is coupled to right and left side members 22,24. Body 12 is preferably manufactured by unibody construction via permanently attaching members 22,24,26,28,36 to one another. As used herein, the term "permanently attaching" or "permanently attached" shall denote a manner of attaching two components to one another wherein the components cannot be detached without cutting or breaking the components apart. Preferably, members 22,24,26,28,36 are welded to one another. It can be seen from FIGS. 1 through 3 that substantially all of the mechanical components of aerator 10 are supported on/by members 22,24,26,28,36 of body 12.

As opposed to conventional power aerators which typically employ a non-sheet metal structural frame with sheet metal components bolted thereto, the sheet metal components (i.e., members 22,24,26,28) of inventive aerator 10 are actually load-bearing structural members. As perhaps best shown in FIG. 3, wheels 14 are directly coupled to right and left side members 22,24. As used herein, the term "directly coupled" shall denote a manner of coupling two elements to one another wherein the elements directly contact one another, as opposed to having an intermediate structure disposed between the two elements. Right and left side members 22,24 each include a pair of reinforced openings that receive an axle of wheels 14, thereby allowing wheels 14 to be rotatably coupled to right and left side members 22,24. In this configuration, all of the weight of aerator 10 that is supported by wheels 14 is transferred to side members 22,24. Thus, side members 22,24 bear a substantial portion of the weight of aerator 10. Preferably, side members 22,24 bear a majority (i.e., more than 50 percent) of the weight of aerator 10.

Referring now to FIGS. 1 through 3 and 6, front member 26 of body 12 extends between and is permanently attached to right and left side members 22,24. Motor 16 is directly coupled to and entirely supported on front member 26. As perhaps best shown in FIG. 6, the front edge of front member 26 is bent in a configuration which provides significant structural reinforcement to front member 26. The bent configuration of the front edge of front member 26 presents a sloped surface to which guard bar 20 can be rigidly and permanently attached. The rear edge of front member 26 is also bent in a generally L-shaped configuration to provide significant structural reinforcement to front member 26. As perhaps best shown in FIGS. 2 and 6, rear member 28 extends between and is permanently attached to right and left side members 22,24. An upper portion of rear member 28 is bent in a generally V-shaped configuration to thereby provide significant structural reinforcement to rear member 28.

Figures 4, 5:
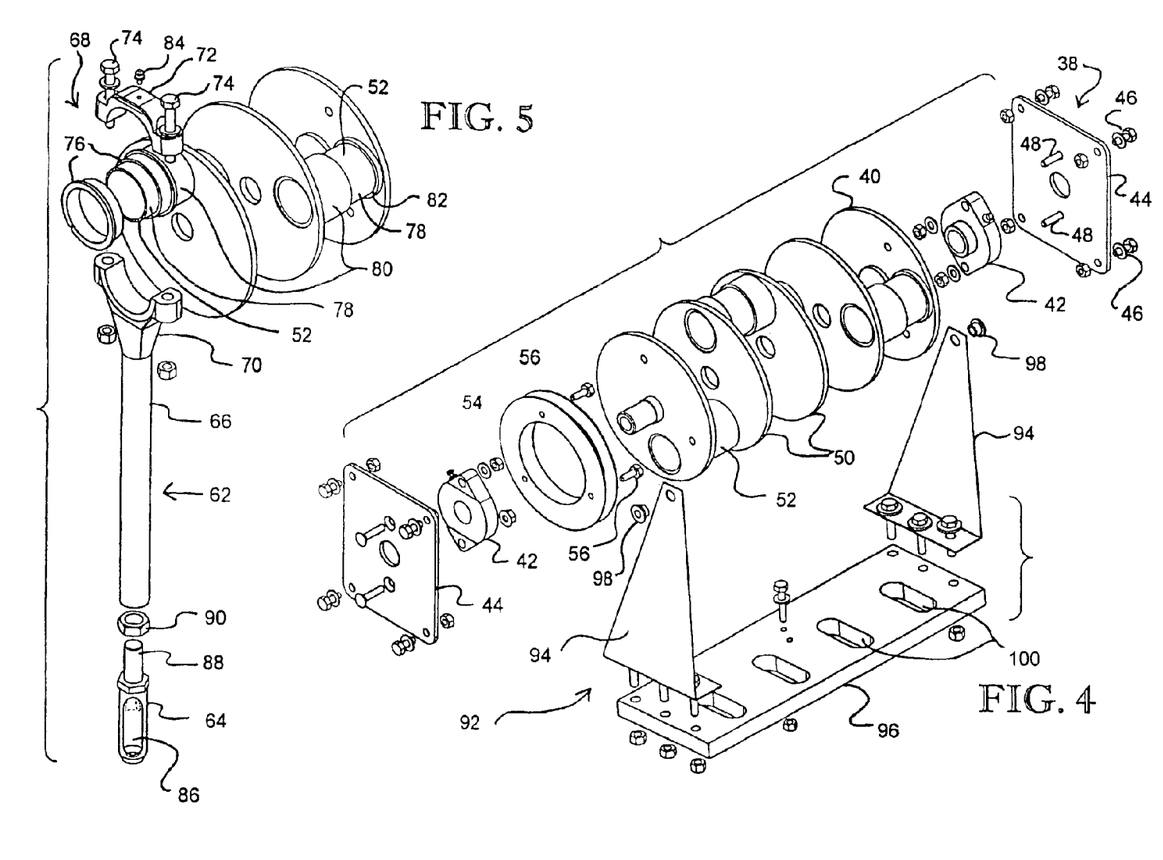
FIG. 4 is an isometric assembly view of the crank shaft assembly and swingable tine guide positioned within and supported by the body of the power aerator.
FIG. 5 is an isometric assembly view of a tine of the power aerator, particularly illustrating the manner in which the tine connects to an eccentric bar of the crank shaft.

Referring to FIG. 3, body 12 of aerator 10 houses and supports the internal mechanical components of aerator 10. In particular, a crank shaft assembly 38 is directly coupled to, supported by, and extends between right and left side members 22,24. Referring now to FIGS. 3 and 4, crank shaft assembly 38 generally includes a crank shaft 40 which is rotatably coupled to body 12 via bearings 42, end plates 44, and bolts 46,48. Crank shaft 40 includes a plurality of substantially upright axially spaced plates 50 which are aligned along the axis of rotation of crank shaft 40. Crank shaft 40 also includes a plurality of eccentric bars 52, each disposed between a respective pair of aligned plates 50. Eccentric bars 52 are offset from the axis of rotation of crank shaft 40. Adjacent eccentric bars 52 are staggered relative to one another around the axis of rotation of crank shaft 40. Crank shaft assembly 38 also includes a drive shieve 54 which is rigidly coupled to crank shaft 40 via bolts 56. As best shown in FIG. 3, a motor shieve 58 of motor 16 powers a drive belt 60 which, in turn, rotates drive shieve 54 and crank shaft 40.

Referring now to FIGS. 3 through 5, a plurality of tines 62 are rotatably coupled to eccentric bars 52 of crank shaft 40. As best shown in FIG. 5, each tine 62 includes an end piece 64, an elongated shaft portion 66, and a connection portion 68. Connection portion 68 couples each tine 62 to a respective eccentric bar 52. Connection portion 68 includes a base 70 permanently fixed to shaft portion 66 and a cap 72 which can be removably coupled to base 70 via bolts 74. Base 70 and cap 72 are configured to cooperatively define an opening through which eccentric bar 52 can extend. A bushing 76 is preferably disposed within the opening cooperatively defined by base 70 and cap 72 and extends around a narrow portion 78 of eccentric bar 52. Narrow portion 78 of bar 52 and a wide portion 80 of bar 52 define a pair of shoulders 82 between which bushing 76 is disposed to thereby inhibit axial shifting of bushing 76 and tine 62 relative to eccentric bar 52. Bushing 76 allows eccentric bar 52 to rotate freely within the opening cooperatively defined by base 70 and cap 72 of tine 62. A grease fitting/zerk 84 is provided in cap 72 to lubricate bushing 76 and reduce wear caused by the rotation of crank shaft 40. Thus, eccentric bars 52 and connection portion 68 cooperate to allow rotary motion of crank shaft 40 to be converted to reciprocal motion of tines 62. End piece 64 of tine 62 is adapted to cut and remove plugs from turf when tine 62 is reciprocated into and out of the turf. End piece 64 defines an axially extending opening 86 which receives the cut plug from the turf. End piece 64 is preferably formed of a high-strength heat-treated metal that minimizes damage and wear to end piece 64. End piece 64 also includes a male threaded portion 88 that cooperates with a female threaded end of shaft portion 66 and a lock nut 90 to thereby allow end piece 64 to be easily attached, removed, or replaced.

Referring now to FIGS. 3 and 4, aerator 10 includes a swingable tine guide 92 that generally includes a pair of laterally spaced side supports 94 and a guide plate 96. The lower ends of side supports 94 are rigidly coupled to opposite ends of guide plate 96 so that guide plate 96 extends between the lower ends of side supports 94. The upper ends of side supports 94 are pivotally coupled to right and left side members 22,24 via bushings 98. Thus, swingable tine guide 92 is hingedly coupled to and supported by right and left side members 22,24. Guide plate 40 defines a plurality of elongated slots 100. As perhaps best shown in FIG. 3, each slot 100 is adapted to receive a respective tine 62. During reciprocal motion of tines 62, guide plate 96 maintains tines 62 in a substantially upright position.

Referring to FIGS. 1 and 2, handle assembly 18 includes a generally U-shaped handle bar 102 projecting rearwardly and upwardly from body 12 of aerator 10. The upper end of handle bar 102 presents a generally horizontal portion which can be manually grasped by the user to facilitate manipulation of aerator 10. Handle assembly 18 also includes a cross bar 104 to which a clutch lever 106 and an aeration/transport lever 108 are pivotally coupled. Clutch lever 106 and aeration/transport lever 108 can be shifted between a down position, wherein levers 106,108 are positioned closer to body 12, and an up position, wherein levers 106,108 are positioned further from body 12. Levers 106,108 each include a generally U-shaped handle portion which receives the generally horizontal portion of handle bar 102 when levers 106,108 are in the up position. Handle assembly 18 also includes a swingable lock 110 pivotally coupled to the generally horizontal portion of handle bar 102. Swingable lock 110 is operable to selectively lock either clutch lever 106 or aeration/transport lever 108 in the up position. Clutch lever 106 is coupled to a clutch cable 112 via a spring 114. Clutch lever 106 is operable to pull on or increase the tension in clutch cable 112 when clutch lever 106 is shifted from the down position to the up position. Aeration/transport lever 108 is operable to pull on an aeration/transport cable 116 when lever 108 is shifted from the down position to the up position.

Referring to FIGS. 1 and 3, when clutch lever 106 (shown in FIG. 1) is shifted from the down position to the up position, clutch cable 112 causes a clutch shieve 118 (shown in FIG. 3) to shift from a position to an engaged position. When clutch shieve 118 is in the engaged position, clutch shieve 118 provides sufficient tension in drive belt 60 so that the rotation of motor shieve 58 causes rotation of drive shieve 54 via drive belt 60. When clutch shieve 118 is in the disengaged position, the tension in drive belt 60 is decreased to a level which allows motor shieve 58 to rotate without rotating drive shieve 54. The shifting of clutch shieve 118 between the engaged and disengaged position is facilitated by a clutch plate 120 which is pivotally coupled to right side member 22 of body 12. A spring 122 can be coupled between clutch plate 120 and body 12 to thereby bias clutch shieve 118 towards the disengaged position.

Figure 6:
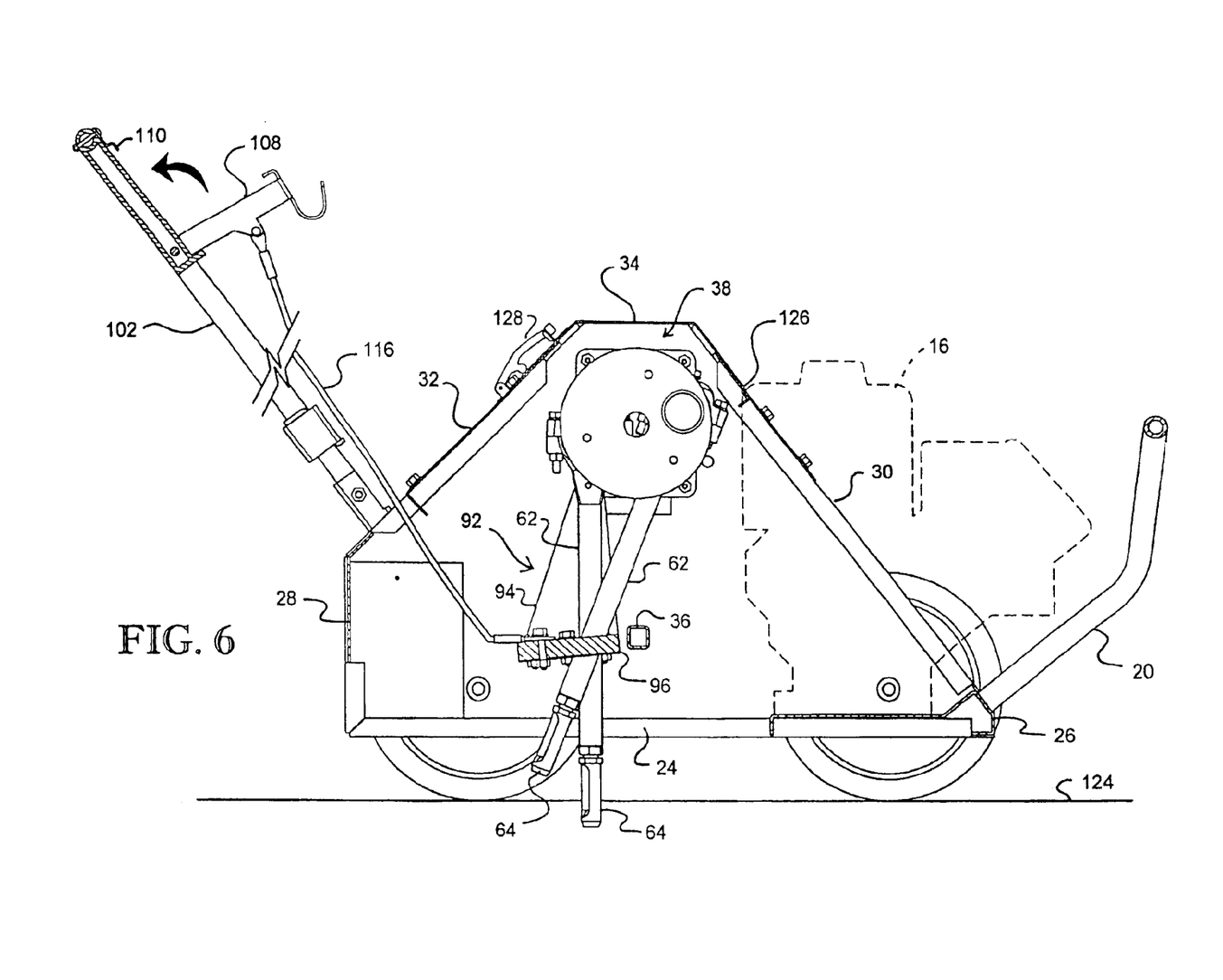
FIG. 6 is a sectional side view of the power aerator, particularly illustrating the swingable tine guide in an aeration position where the tines are positioned for cutting and removing plugs from the turf.
Figure 7:
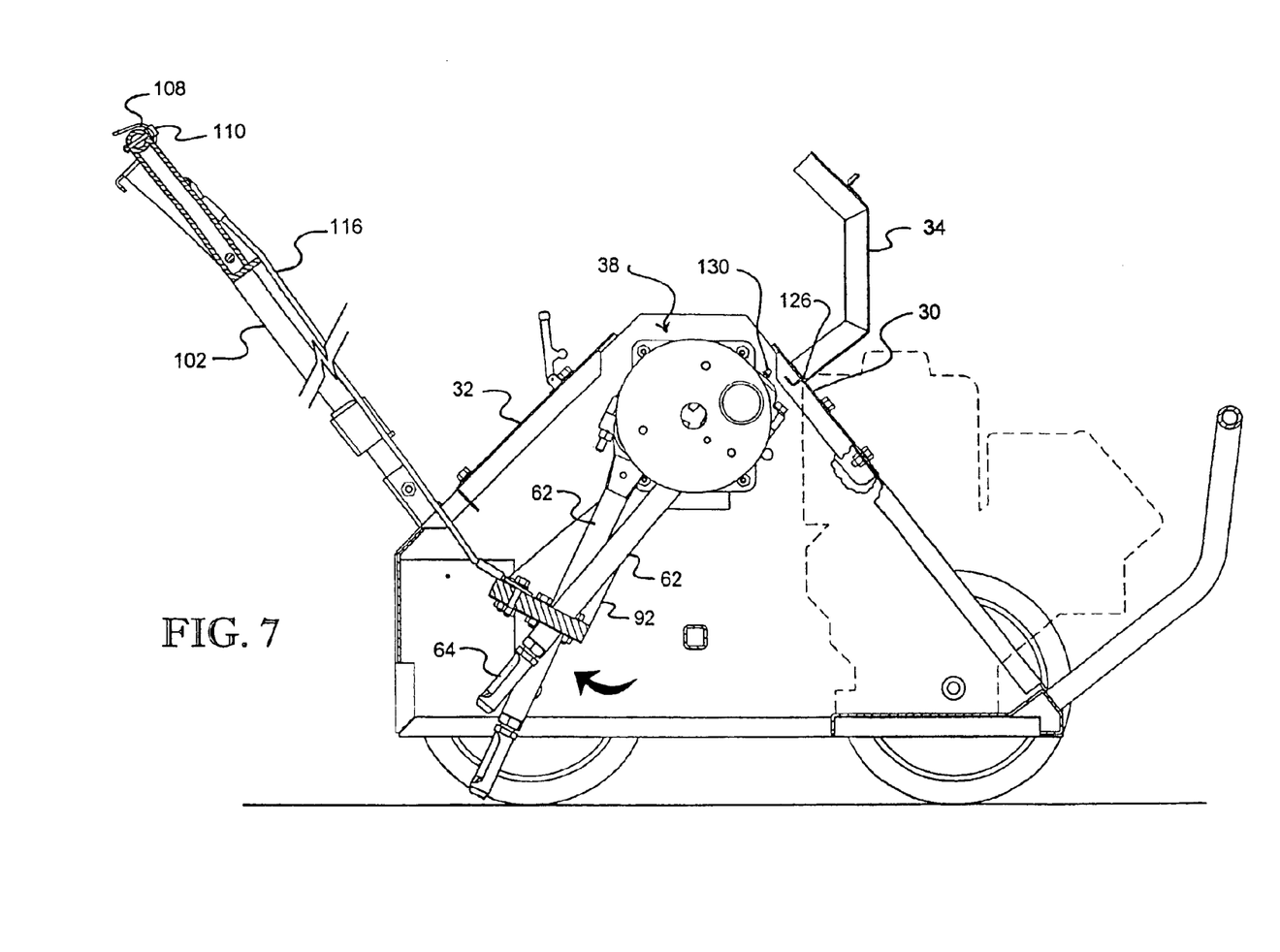
FIG. 7 is a sectional side view of the power aerator, particularly illustrating the swingable guide tine in a transportation position where the tines are positioned out of contact with the turf.

Referring to FIGS. 6 and 7, when aeration/transport lever 108 is shifted from the down position (shown in FIG. 6) to the up position (shown in FIG. 7), aeration/transport cable 116 causes tine guide 92 to shift from an aeration position (shown in FIG. 6) to a transport position (shown in FIG. 7). When tine guide 92 is shifted from the aeration position (shown in FIG. 6) to the transport position (shown in FIG. 7), tines 62 are pulled from a substantially upright position to a less upright position by guide plate 96 of tine guide 92. When tine guide 92 is in the aeration position, end pieces 64 of tines 62 can extend below wheels 14 so that plugs can be cut and removed from the ground 124 via the generally upright reciprocal movement of tines 62. When tine guide 92 is in the transport position, end pieces 64 of tines 62 are swung into a position where they can not extend below wheels 14, thereby allowing aerator 10 to be rolled across the ground 124 without interference from tines 62.

Referring to FIGS. 1, 2, 6, and 7, it can be seen that front, rear, and top covers 30,32,34 extend between and are releasably coupled to right and left side members 22,24.

Covers 30,32,34 are preferably formed from sheet metal of substantially lighter weight than the sheet metal used to form members 22,24,26,28 of body 12. Preferably, covers 30,32, 34 are formed from 14 to 24 gauge sheet metal, most preferably 16 to 22 gauge steel sheet metal. Top cover 34 is hingedly coupled to front cover 30 via releasable hinge 126. Top cover 34 can be shifted between a closed position (shown in FIGS. 1, 2, and 6) and an open position (shown in FIG. 7) by simply pivoting top cover 34 relative to front cover 30 at hinge 126. Latches 128 are provided to hold top cover 34 in the closed position. However, latches 128 can be easily released to allow top cover 34 to be shifted into the open position. When top cover 34 is in the closed position, top cover 34 covers a substantial portion of crank shaft assembly 38. When top cover 34 is in the open position, crank shaft assembly 38 is substantially uncovered and can be accessed from above to thereby allow for the performance of routine maintenance, such as lubrication of tines 62 via grease fittings/zerks 84.

Referring to FIGS. 1 and 8 through 10, handle assembly 18 of aerator 10 can be shifted between an operating position (shown in FIG. 1) and a transport/storage position (shown in FIG. 10). Handle assembly 18 includes a handle base 130 for hingedly coupling handle bar 102 to body 12. Handle base 130 includes a channel 132, a collar 134, and a hinge 136. Referring now to FIG. 8, when handle assembly 18 is in the operating position, handle bar 102 is locked in channel 132 by extending collar 134 around handle bar 102 and channel 132. Referring now to FIG. 9, to shift handle assembly 18 out of the operating position, collar 134 is slid upwardly off of channel 132 and onto handle bar 102. Handle bar 102 can then be pivoted upwardly and forwardly via hinge 136. Channel 132 defines an opening 138 which allows the distal end of handle 102 to extend therethrough when handle assembly 18 is shifted out of the operating position.

Referring now to FIG. 10, when handle assembly 18 of aerator 10 is in the storage/transport position, aerator 10 has a very compact configuration. Preferably, the compact configuration of aerator 10 allows aerator 10 to be transported in the trunk of a standard mid-size or full size car. When handle assembly 18 is in the storage/transport position (shown in FIG. 10), it is preferred for the maximum height (h) of aerator 10 to be less than about 36 inches, more preferably less than about 30 inches, and most preferably less than 24 inches. When handle assembly 18 is in the storage/transport position (shown in FIG. 10), it is preferred for the maximum length (l) of aerator 10 to be less than about 48 inches, more preferably less than about 42 inches, and most preferably less than 39 inches. When handle assembly 18 is in the storage/transport position, it is preferred for the maximum width (w) of aerator 10 to be less than about 36 inches, more preferably less than about 30 inches, and most preferably less than 24 inches. The unibody construction of turf aerator 10 allows aerator 10 to have a significantly more compact configuration than conventional aerators using a frame-type construction. A significant advantage of the compact configuration of turf aerator 10 is the reduced wheel base (i.e., distance between the axes of rotation of the front and rear wheels) of inventive turf aerator 10. It is preferred for the wheel base of turf aerator 10 to be less than about 36 inches, more preferably less than about 24 inches, and most preferably less than 20 inches.

Referring now to FIG. 11, it is preferred for aerator 10 to create a relatively dense plug pattern in the turf. Preferably, the maximum distance (A) between plugs aligned along the direction of travel of aerator 10 is less than about 12 inches, more preferably less than about 10 inches, and most preferably less than 8 inches. Preferably, the maximum lateral distance (B) between plugs perpendicular to the direction of travel of aerator 10 is less than about 8 inches, more preferably less than about 6 inches, and most preferably less than 4 inches. Preferably, the density of the plugs in the turf is at least 6 plugs per square foot, more preferably at least 8 plugs per square foot, and most preferably between 10 and 15 plugs per square foot.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the Doctrine of Equivalents to determine and assess the reasonably fair scope of the present invention as it pertains to any apparatus not materially departing from but outside the literal scope of the invention as set forth in the following claims.

What is claimed is:

1. A turf aerator comprising:
 a crank shaft assembly including a rotatable crank shaft comprising a plurality of axially spaced plates and a plurality of eccentric bars, each of said eccentric bars being rigidly coupled to and extending between a respective pair of adjacent plates; and
 a plurality of generally upright tines, each of said tines including a connection portion rotatably coupled to a respective eccentric bar and a tip portion configured to cut and penetrate the turf, said tip portion extending radially from said respective eccentric bar.

2. The turf aerator according to claim 1,
 each of said connection portions defining an opening through which a respective eccentric bar extends.

3. The turf aerator according to claim 2,
 said connection portion including a base defining a first portion of the opening and a cap, defining a second portion of the opening,
 said cap being releasably coupled to the base.

4. The turf aerator according to claim 3; and
 a bushing at least partly received in the opening and disposed between the connection portion and the eccentric bar.

5. The turf aerator according to claim 4,
 said cap including a grease fitting for permitting lubrication of the bushing.

6. The turf aerator according to claim 1,
 said tine including an elongated shaft portion extending between the connection portion and the tip portion,
 said tip portion including a removable end piece that is threadably coupled to the shaft portion.

7. The turf aerator according to claim 1,
 said aerator including less than 8 tines.

8. The turf aerator according to claim 1,
 said aerator including 3 to 5 tines.

9. The turf aerator according to claim 1; and
 a tine guide positioned generally below the crank shaft assembly and including a guide plate defining a plurality of slots,
 each of said slots receiving a respective one of the tines.

10. The turf aerator according to claim 9,
 said guide plate being shiftable relative to the crank shaft assembly between an aeration position and a transport position, said guide plate causing shifting of the tines when the guide plate is shifted between the aeration position and the transport position.

11. The turf aerator according to claim 10, said tines being in a more upright position when the guide plate is in the aeration position than when the guide plate is in the transport position.

12. The turf aerator according to claim 11; and a body for supporting the crank shaft assembly and tine guide; and a plurality of wheels rotatably coupled to the body and providing for movement of the body relative to the turf.

13. The turf aerator according to claim 12, said tine guide including a pair of side supports, each of said side supports presenting first and second ends, said first ends of the side supports being rigidly coupled to the guide plate, said second ends of the side supports being pivotally coupled to the body so that the guide plate swings relative to the body along a substantially arcuate path when the guide plate is shifted between the aeration position and the transport position.

14. The turf aerator according to claim 12, said crank shaft assembly including a pair of bearings rigidly coupled to the body and supporting the crank shaft for rotation relative to the body.

15. The turf aerator according to claim 14; and a motor rigidly coupled to and supported by the body; and a drive belt rotated by the motor, said crank shaft assembly including a shieve rigidly coupled to the crank shaft and operably coupled to the drive belt so that rotation of the drive belt causes rotation of the shieve.

16. The turf aerator according to claim 15, said body having a unibody construction.

17. The turf aerator according to claim 12; and a top cover hingedly coupled to the body, said top cover being selectively shiftable between a closed position wherein the top cover covers at least a portion of the crank shaft assembly and an open position wherein the crank shaft assembly is substantially uncovered.

18. A turf aerator comprising:

a crank shaft assembly including a rotatable crank shaft comprising a plurality of axially spaced plates and a plurality of eccentric bars, each of said eccentric bars having spaced apart ends, each of said eccentric bars disposed between a respective pair of adjacent plates, said plates presenting opposite radially extending surfaces, each of said spaced apart ends being rigidly coupled to a respective one of said surfaces; and a plurality of generally upright tines, each of said tines including a connection portion rotatably coupled to a respective eccentric bar and a tip portion configured to cut and penetrate the turf.

19. The turf aerator according to claim 18, each of said connection portions defining an opening through which a respective eccentric bar extends.

20. The turf aerator according to claim 19, said connection portion including a base defining a first portion of the opening and a cap defining a second portion of the opening, said cap being releasably coupled to the base.

21. The turf aerator according to claim 2; and a bushing at least partly received in the opening and disposed between the connection portion and the eccentric bar.

22. The turf aerator according to claim 21, said cap including a grease fitting for permitting lubrication of the bushing.

23. The turf aerator according to claim 18, said tine including an elongated shaft portion extending between the connection portion and the tip portion, said tip portion including a removable end piece that is threadably coupled to the shaft portion.

24. The turf aerator according to claim 18, said aerator including less than 8 tines.

25. The turf aerator according to claim 18, said aerator including 3 to 5 tines.

26. The turf aerator according to claim 18, said tip portion extending radially from said respective eccentric bar.

27. A turf aerator comprising:

a crank shaft assembly including a rotatable crank shaft comprising a plurality of axially spaced plates and a plurality of eccentric bars, each of said eccentric bars being rigidly coupled to and extending between a respective pair of adjacent plates;

a plurality of generally upright tines, each of said tines including a connection portion rotatably coupled to a respective eccentric bar and a tip portion configured to cut and penetrate the turf; and a tine guide positioned generally below the crank shaft assembly and including a guide plate defining a plurality of slots, each of said slots receiving a respective one of the tines, said guide plate being shiftable relative to the crank shaft assembly between an aeration position and a transport position, said guide plate causing shifting of the tines when the guide plate is shifted between the aeration position and the transport position.

28. The turf aerator according to claim 27, said tines being in a more upright position when the guide plate is in the aeration position than when the guide plate is in the transport position.

29. The turf aerator according to claim 28; and a body for supporting the crank shaft assembly and tine guide; and a plurality of wheels rotatably coupled to the body and providing for movement of the body relative to the turf.

30. The turf aerator according to claim 29, said tine guide including a pair of side supports, each of said side supports presenting first and second ends, said first ends of the side supports being rigidly coupled to the guide plate, said second ends of the side supports being pivotally coupled to the body so that the guide plate swings relative to the body along a substantially arcuate path when the guide plate is shifted between the aeration position and the transport position.

31. The turf aerator according to claim 29, said crank shaft assembly including a pair of bearings rigidly coupled to the body and supporting the crank shaft for rotation relative to the body.

32. The turf aerator according to claim 31; and
a motor rigidly coupled to and supported by the body; and
a drive belt rotated by the motor,
said crank shaft assembly including a shieve rigidly coupled to the crank shaft and operably coupled to the drive belt so that rotation of the drive belt causes rotation of the shieve.

33. The turf aerator according to claim 32,
said body having a unibody construction.

34. The turf aerator according to claim 29; and
a top cover hingedly coupled to the body,
said top cover being selectively shiftable between a closed position wherein the top cover covers at least a portion of the crank shaft assembly and an open position wherein the crank shaft assembly is substantially uncovered.

* * * * *